United States Patent

Mashimo

[15] 3,653,256
[45] Apr. 4, 1972

[54] HARDNESS MEASURING APPARATUS
[72] Inventor: Misao Mashimo, Yokohama, Japan
[73] Assignee: Kabushiki Kaisha Akashi Seisakusho, Tokyo, Japan
[22] Filed: Mar. 24, 1970
[21] Appl. No.: 22,276

[30] Foreign Application Priority Data

Mar. 29, 1969 Japan..................................44/23600

[52] U.S. Cl..................................................73/81
[51] Int. Cl..............................................G01n 3/40
[58] Field of Search.............................73/81, 82, 83

[56] References Cited

UNITED STATES PATENTS 2,917,919  12/1959  Schulze et al..............................73/81

FOREIGN PATENTS OR APPLICATIONS 464,005  4/1937  Great Britain..............................73/81
603,531  9/1934  Germany....................................73/81

*Primary Examiner*—Jerry W. Myracle
*Attorney*—Kane, Dalsimer, Kane, Sullivan and Kurucz

[57] ABSTRACT

An apparatus for measuring hardness of a specimen comprises indenting means for forming an indentation in the upper surface of the specimen, loading means for applying a predetermined load onto said indenting means and an optical system for measuring said formed indentation which is a measure of the hardness of the tested specimen. The loading means is mechanically disconnected from the indenting means and adapted to be engaged with the latter, only when the load is applied thereto upon the measurement. By such arrangement, the rigidity, mass as well as bulk of the supporting structure for the indenting means can be considerably reduced, and hence a dynamical load due to such factors which may constitute a source of error in the measurement can be effectively eliminated.

12 Claims, 5 Drawing Figures

INVENTOR
MISAO MASHIMO

HARDNESS MEASURING APPARATUS

BACKGROUND OF THE INVENTION

1. Field of the Invention

The present invention relates in general to a micro-hardness tester or miniload hardness tester. More particularly, this invention relates to an apparatus for measuring Vikers hardness of a specimen with a very small load applied thereto.

In the measurement of the Vikers hardness, a pyramidal indenting or pressing element of diamond is pressed to the surface of the specimen to be tested under a load, to thereby produce a permanent indentation in the surface of the specimen. Thereafter, the size of the produced indentation is measured by means of a microscope.

2. Description of the Prior Art

A typical apparatus which has been priorly employed in such measurement of hardness and is known in the name of micro-hardness tester or miniload hardness tester generally comprises a swingable lever having two long and short arms. Weighing masses of various weights are exchangeably disposed on the long arm at the free end thereof and the indenting element such as pointed diamond is fixed to the underside of said long arm in the vertical alignment with the weight. The specimen to be tested is, of course, placed under the indenting element. A control member is provided, near the free end of said short arm, which control member bears against said short arm of the swingable lever to exert a counterbalancing force. In testing operation, the counterbalancing force of the control member is progressively removed, whereby the load of the weight of the weighing mass is applied to the surface of the specimen by way of the pointed indenting element. After the indentation, the counterbalancing force is again applied to the short arm of the pivotal lever to disengage the indenting element from the specimen, and the whole weighing lever system is then laterally swung to thereby disclose the specimen, which is now ready to be viewed by the measuring optical system.

Such hitherto known type of the hardness tester has various drawbacks. First, the fulcrum member for supporting the swingable weighing lever is often damaged, because the lever has to be swung or rotated with the loading weight left disposed thereon. A fulcrum pivot member having a great rigidity may be employed. However, this will interfere with the maintenance of precision in the measurements. Second, the rotatable weighing lever must have enough rigidity for withstanding a maximum weight of the weighing mass as employed in the test, in order that the lever be prevented from being distorted by such maximum load. This necessarily results in the increase of the inertia mass of the lever, which in turn plays an additional dynamic load in the testing and makes the results of the measurements erroneous. This is particularly true in the case when the hardness test is to be performed with a minimum weight. Third, the length of the long arm of the rotatable weighing lever is limited for the above reason. The indenting element cannot therefore be pressed into the specimen perpendicularly to the surface. Thus, distortion is often produced in the formed indentation.

SUMMARY OF THE INVENTION

Accordingly, an important object of the present invention is to provide a novel and improved hardness tester in which the disadvantages of the conventional hardness tester such as the above mentioned are substantially eliminated.

Another object of this invention is to provide a micro-hardness tester which assures a precise measurement of the hardness of a specimen even with a small loading weight or micro-load.

Still another object of this invention is to provide a hardness tester which is inexpensive in construction, simple in manipulation and reliable in the operation.

Further object of this invention is to provide a novel construction of the hardness tester which allows the use of the rotatable or swingable lever having less rigidity for supporting the indenting element.

Further object of this invention is to provide a novel construction of the hardness tester which allows the use of the rotatable lever having a long arm of a greater length for mounting the indenting element at the free end thereof.

Still further object of this invention is to provide a hardness tester having an indentation producing structure and an optical system for optically viewing or observing the indentation, both of which can be easily and exchangeably brought to the operating position, while the specimen to be tested is throughout disposed at a predetermined same place.

Still further object of the present invention is to provide an improved hardness tester in which undesirable dynamic loading applied to the specimen in addition to a predetermined static load is reduced at a minimum.

These and other objects of the present invention can be accomplished by providing a hardness measuring apparatus which comprises indenting means and weighing means for applying substantially statical load onto said indenting means to press it against the surface of a specimen to be tested to thereby produce therein an indentation which is a measure of the hardness of the specimen. According to the present invention, said weighing means is physically disconnected from the indenting means and adapted to be operationally connected or contacted to the indenting means only when the indenting load is to be applied thereto. The indenting means is preferably composed of a vertically rotatable lever having an indenting element mounted on the lower surface of the lever adjacent to the free end of an arm thereof. The weighing means may comprise a vertically swingable supporting member which is disposed separately from but in the vertical alignment with the indenting element and adapted to exchangeably support a plurality of weighing masses having predetermined different weights. The vertically swingable lever should preferably be rotatable in the horizontal plane, too. An optical system for measuring the indentation as formed in the specimen may then be mounted on a disk which is independently rotatable in a horizontal plane below the said indenting element supporting lever. In such construction, the indenting element can be laterally displaced by swinging the lever in the horizontal plane after the indentation has been produced in the specimen, and then the optical system may be brought to the measuring position by rotating the disk. The specimen thus can be placed throughout at the same place during the testing process.

In a preferable embodiment of this invention, the lever which is rotatable in a vertical place may be composed of long and short arms. A vertical rod having the indenting element fixed at the lower end thereof may be supported by the long arm of the lever at one end thereof in vertical alignment with the weighing mass supporting member, while the short arm carries a counterbalancing weight which urges the lever to swing in such direction that the indenting element is moved away from the specimen, when no load is applied to the rod at the top end by the weighing means.

In another preferable embodiment of the present invention, the swingable lever which carries the vertical rod having the indenting element may be composed of a one-arm lever in a cantilever-like form with the short arm as well as the counterbalancing weight supported thereon completely omitted. The vertical rod may then be supported by a horizontally disposed one or more leaf springs which are disposed in a cantilever-like manner and adapted to urge the indenting element supporting rod upwardly, namely in such direction that the indenting element such as pointed diamond is always away from the specimen when the testing load is not applied to the rod. In this embodiment, the inertia mass of the lever or of the whole indenting structure is remarkably reduced by the fact that the short arm of the lever as well as the counter weight can be completely dispensed. Thus, the undesirable dynamic load as possibly applied to the specimen in the measurement can be remarkably reduced.

BRIEF DESCRIPTION OF THE DRAWINGS

The above mentioned and other objects as well as advantageous and novel features of the present invention will become more apparent by referring to the following description taken in conjunction with the accompanying drawings in which.

DETAILED DESCRIPTION OF THE INVENTION

Before entering into the description of preferable embodiments of the micro-hardness tester according to this invention, a conventional hardness tester will be at first explained for better understanding of this invention.

Figure 1:
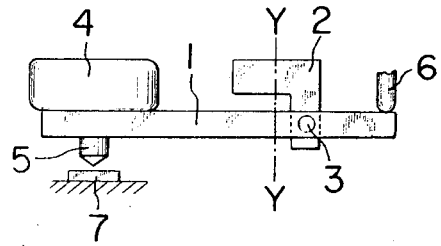
FIG. 1 is a schematic side view showing a hitherto known micro-hardness tester.

Referring to FIG. 1, a typical micro-hardness tester which has been hitherto widely employed comprises a weighing lever 1 which is rotatably supported on a lever holding member 2 by means of a pivot 3 at an intermediate portion between both ends of the lever 1 but displaced from the center thereof. This lever 1 may be regarded as a two-arm lever having a long arm and a short arm, and swingable arround a horizontal axis, namely axis of the pivot 3. A cylindrical weight 4 is mounted on the long arm of the lever 1 near a free end thereof and an indenting element 5 such as a piece of diamond is mounted on the underside of the lever 1 coaxially with the weight 4. The L-shaped mounting member 2 is supported on a stationary portion of the testing apparatus in such a manner that the member 2 and hence the lever 1 can be rotated or swung arround a vertical axis as indicated by a phantom line Y—Y. Reference numeral 6 indicates a control member which is disposed to abut the upper surface of the lever 1 at a free end of the short arm thereof.

In operation of the above apparatus, a specimen 7, the hardness of which is to be tested, is disposed on a predetermined place of the tester apparatus and the lever 1 is then rotated in a horizontal plane arround the axis Y—Y until the indenting element 5 is brought to the position aligned with the specimen 7. When the control member 6 is displaced upwardly as viewed in FIG. 1, the indenting or pressing element or pointed diamond 5 is pressed into the specimen 7 under the load or force exerted by the weight 4 due to the unbalanced condition of the lever 1. Thereafter, the control member 6 is moved downwardly to disengage the indenting element 5 from the specimen 7. The lever 1 is horizontally rotated arround the axis Y—Y to disclose the specimen 7 and a measuring microscope (not shown) is then disposed over the specimen 7 for the examination of the indentation formed therein.

The conventional micro-hardness tester of the type as above mentioned has various drawbacks, as hereinbefore mentioned. In the first place, the supporting pivot 3 for the weighing lever 1 is easily subject to damage, because the weighing system has to be moved or operated with the weight 4 left disposed on the lever 22 when the test is carried out. If the pivot member 3 having an increased rigidity is employed in order to overcome such difficulty, then the precise selection or determination of weight to be applied to the specimen becomes difficult, particularly when the hardness test is to be done with a light weight. Of course, the weight 4 may be loaded and unloaded for the protection of the pivot member 3 each time when the weighing system is moved. However, this will involve complexity and trouble in the operation of the tester.

Furthermore, in order to prevent the lever 1 from being distorted when a weight having a predetermined maximum value is disposed thereon, the lever must have a sufficient rigidity. This necessarily results in an increase in inertia mass or momentum of the lever 1 when it is rotated arround the fulcrum 3 thereof. Accordingly, in case the lever 1 is formed with a great rigidity so that it can withstand a maximum weight as employed without being distorted, then dynamical load induced by the inertia mass of such rigid lever in its movement will constitute source of error. This is particularly true, when the test is performed with a minimum indenting load as in the case where no weight such as specific mass 4 is employed and the indenting force is derived from the unbalanced condition of the asymmetrical lever itself.

As hereinbefore mentioned, an important object of this invention is to provide a novel micro-hardness testing apparatus in which these disadvantages of the conventional hardness tester are substantially eliminated.

Figure 2:
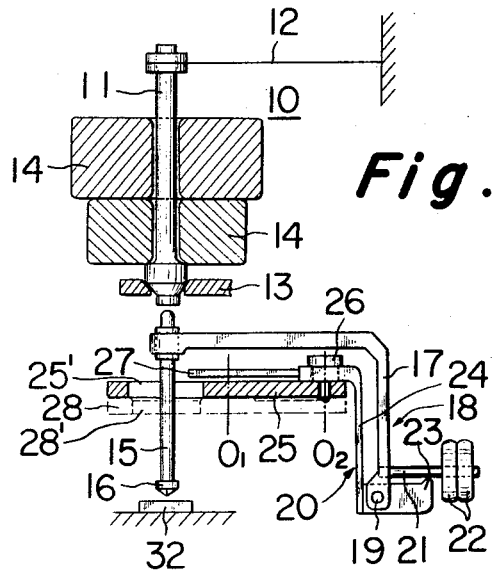
FIG. 2 shows in a schematic side view a preferable embodiment of a micro-hardness tester according to this invention.

Now, referring to FIG. 2 which shows a preferable embodiment of the hardness tester according to the present invention, reference number 10 generally indicates a weighing structure or means comprising a weight supporting vertical rod 11 which is resiliently supported at the upper end thereof by a resilient member 12 which in turn is fixed to a suitable stationary portion of the apparatus. The lower end of the rod 11 is supported by a conical bearing opening formed in a cantilever-like arm 13 at the free end thereof, the other end of which arm is also pivotably connected to a stationary portion of the apparatus. Weighing mass 14 is disposed on the rod 11 so that all the weight or lead of the mass 14 is applied to the vertical rod 11. Disposed in the vertical alignment with but physically disconnected from this weight supporting rod 11 is a length of a rod 15 which has an indenting element 16 such as a pointed diamond at the lower end thereof. It will be understood that, by swinging downwardly and upwardly the weighing structure 10 including the weighing mass 14 and the supporting rod 11 therefor, the lower end of the rod 11 is, respectively, engaged to and disengaged from the upper end of the load transmitting rod 15. This rod 15 is secured to a free end of a L-shaped long arm 17 of a lever 18 which is mounted by means of a fulcrum pivot 19 on a mounting member 20 and can be rotated or swung vertically around the pivot 19. The lever 18 further has a short arm 21 provided with a counterweight 22 at the free end thereof, said weight 22 being so selected that the lever arm 18 is always urged to rotate arround the pivot 19 in the clockwise direction, when no load of the testing weight 14 is applied to the transmission rod 15. This clockwise rotation of the supporting lever 18 is limited by a stop 23 which is provided on the mounting member 20 in a position to abut the underside of the short arm 21 of the supporting lever 18. In this manner, in a rest position of the testing apparatus, a small gap is maintained between the lower end of the weighing rod 11 and the upper end of the transmission rod 15. The mounting member 20 has a L-shaped arm 24 which is mounted on a fixed base plate 25 by means of a pivot shaft 26 rotatably in a horizontal plane arround a vertical axis $O_2$. The base plate 25 is fixed to a stationary portion of the apparatus. The L-shaped arm 24 of the mounting member 20 is integrally formed with a manipulation handle 27, by means of which the member 24 as well as the lever arm 17 together with the load transmission rod 15 as a whole can be horizontally rotated.

Figure 3:
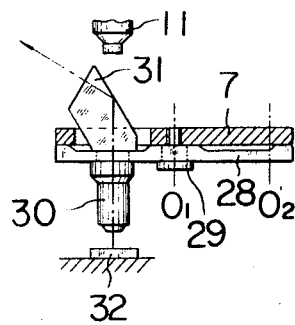
FIG. 3 is a fragmental view of FIG. 2 and shows an optical system which is adapted to be employed in the apparatus of FIG. 2 for the observation of a tested specimen.

As is indicated by a phantom line in FIG. 2, a rotation disk 28 is disposed on the underside of the base plate 25 rotatably around the axis $O_1$ by means of a pivot stud 29 (FIG. 3). It should be noted that the base plate 25 and the rotatable disk 28 have respective sector-like slots 25' and 28' through which the load transmission rod 15 is freely extended. The dimension and the configuration of these slots 25' and 28' are so selected that the horizontal partial rotation of the lever 15 and hence the lateral swing of the rod 15 in the testing operation as hereinafter mentioned are not interfered by these slots.

As is shown in FIG. 3, the rotatable disk 28 carries an optical system comprising an objective lens 30 and a prism 31, which optical system is disposed on the disk 28 in such a manner that by rotating the disk 28, the optical system can be brought to the position at which the optical axis of the objective lens 30 is aligned with the longitudinal axis of the weight supporting rod 11 and the indent formed in the specimen 32.

Figure 4:
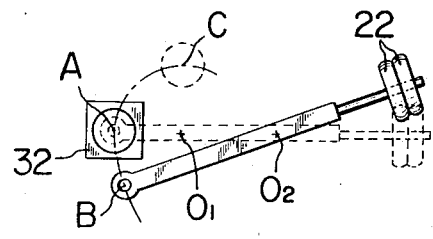
FIG. 4 is a schematic plan view of FIG. 3 and shows a relationship in position between the optical viewing system and a holder for supporting an indenting or pressing structure.

FIG. 4 shows in a schematic plan view the relationship in position among the specimen 32 to be tested, the objective lens 30 and the load transmitting rod 15. As is apparent from this drawing, the objective lens 30 is angularly displaceable between the specimen viewing position A and the rest position C by rotating the mounting disk 28 arround the center axis $O_1$, while the load transmission rod 15 is switched between the indenting position A and the rest position B by the corresponding manipulation of the handle 27 which brings about the rotation or swing of the mounting member 20 arround the center axis $O_2$. In this connection, it is to be noted that the rotational radius of the optical system is selected shorter than that of the horizontal rotation of the load transmitting rod 15.

In testing operation of the above mentioned micro-hardness testing apparatus according to this invention, the weight transmitting rod 15 as well as the specimen 32 to be tested is at first placed at the indenting position A (FIG. 4) at which the longitudinal axes of the rods 11 and 15 and the specimen 32 are vertically aligned to one another. Next, the supporting lever 13 is slowly and steplessly lowered by a suitable mechanism (not shown) to thereby apply statically the load or weight of the weighing mass 14 onto the load transmission rod 15. The supporting lever 15 is then rotated vertically in the counterclockwise direction against the counterweight of the mass 22 with the result that the rod 15 is slowly moved downwardly. The pointed diamond 16 is thus pressed into the specimen 32 under the substantially full static load of the weight 14.

When the indentation step is accomplished, the load of the weighing mass 14 is removed from the rod 15 by lifting the lever 13 upwardly. The rod 15 then returns to the starting position under the counterweight of the mass 22. Thereafter, the rod 15 is laterally displaced in the arcuate slots 25' and 28' by rotating the supporting lever 18 to the rest position B (FIG. 4) by means of the handle 27. The objective lens 30 is subsequently brought to the position A over the specimen 32 from the rest position B by rotating the mounting disk 28 to view and optically measure the indent formed in the specimen. Upon the next new test, the optical system is returned to the rest position C, while the rod 15 as well as the indenting diamond 16 are brought to the position A, and the above process is repeated.

From the foregoing description, it will be appreciated that all the disadvantages of the hitherto known hardness tester can be eliminated by the novel construction of this invention. Namely, in the apparatus according to this invention, a great rigidity is not required for the lever 18, because it is sufficient for the lever 18 to be able to sustain only the weight of the load transmission rod 15. In other words, the weight of the supporting lever 18 can be considerably reduced in comparison with that of the corresponding lever (such as, for example, lever 1 in FIG. 1), and thus the error in the measurement owing to the momentum or inertia mass of such lever can be effectively reduced. This feature also allows the use of a weighing mass 14 of a relatively light weight.

Furthermore, because of the above feature that the lever 18 can be of a light weight, the distance between the load transmission rod 15 and the fulcrum 19 of the supporting lever 18 may be increased. Additionally, the fulcrum 19 may be positioned in the same plane as the specimen 32. The indenting diamond 16 thus can be pressed into the specimen 32 substantially perpendicularly to the upper surface thereof, whereby no distortion is involved in the formation of the indentation.

In the hardness tester of this invention, substantially all the weight of the weighing mass 14 can be directly, namely without any remarkable loss, applied to the specimen as the effective indenting load, whereby the error in the determination of the testing weight can be reduced.

Furthermore, due to the feature that the loading or weighing means 10 including the weighing mass 14 and the supporting rod 11 is separated from the load transmitting structure including the rod 15 and the supporting lever 18, a possible lateral swing or oscillation of the lever 13 will not exert any influence on the formation of the indent in the specimen 32.

In the above mentioned preferable embodiment of this invention, the rotational radius of the load transmitting rod 15 is selected greater than that of the optical system. Such arrangement will contribute to the reduction of the overall dimension of the hardness testing apparatus.

Figure 5:
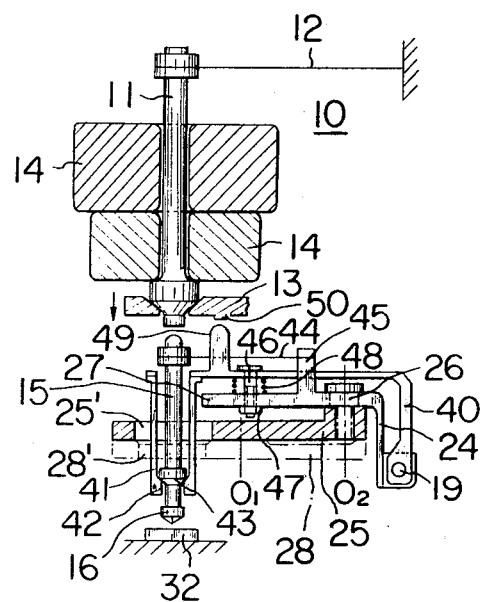
FIG. 5 is a schematic side elevational view of another preferable embodiment according to this invention.

Next, another embodiment of this invention will be described with reference to FIG. 5 in which these parts which serve for the same function as those of the first embodiment described with reference to FIG. 2 are indicated by the same reference numerals. The apparatus shown in FIG. 5 is different from the embodiment shown in FIG. 2 in the load transmission rod supporting structure as to the following respects. Namely, the lever 40 which operationally corresponds to the lever 18 of the first embodiment is composed of a L-shaped arm which is mounted on a mounting member 24 in a cantilever-like fashion by means of a fulcrum pivot member 19 vertically rotatably therearround. This lever 40 has a cylinder 41 integrally formed at the free end thereof. The cylinder or tube 41 has a narrowed lower end portion 42, against which an enlarged portion 43 of a load transmission rod 15 bears in the rest or inoperative position of the tester apparatus. Except for this portion, the rod 15 freely extends through the sleeve 41 and is resiliently supported at the top end thereof by a leaf spring 44 which in turn is secured to an upstand 45 formed on the upper surface of a handle 27. The L-shaped lever 40 and the operating handle 27 are loosely connected with each other through conventional connecting means such as connecting stud 46 and nut 47. Disposed arround this connecting stud 46 and between the lever 40 and the handle 47 is a compression spring 48 which exerts a resilient influence onto the L-shaped lever 40 so that the latter is usually biased to be vertically rotated in the clockwise direction, whereby the load transmission rod 15 having the enlarged portion 43 bearing against the narrowed lower end 42 of the cylinder 41 is disengaged from the specimen 32, when no load is applied to the rod 15. This upward movement can be restricted by the length of the connecting stud 46. The clockwise rotation of the lever 40 in the vertical plane is further limited by a pair of stops 49 and 50 which are provided on the lever 40 and the weighing structure supporting lever 13, respectively, in the opposing position. The leaf spring 44 is preferably composed of a U-shaped member having two parallel legs between which the stop 49 freely projects. The other details of the structure of this apparatus is similar to that of FIG. 2 and further description will therefore be unnecessary.

The above described apparatus is shown in FIG. 5 in the rest or inoperative state. In operating for the test of hardness of the specimen 32, the lever 13 is slowly and steplessly swung downwardly as in the case of embodiment of FIG. 2, as a result of which the weighing mass supporting rod 11 is lowered. However, before the lower end of the rod 11 physically engages the upper end of the load transmission rod 15, the lever 40 is rotated in the counterclockwise direction by means of the stops 49 and 50 against the opposing force exerted by the compression spring 48. The narrowed lower end portion 42 is thus disengaged from the enlarged portion 43 of the rod 15, because the rod 15 is stationarily maintained in the substantially same position by means of the leaf spring 44. After a time interval, the loading rod 11 comes to the position at which it contacts the load transmission rod 15, to thereby press the indenting element 16 into the specimen 32 under the static load of the weighing mass 14. It should be appreciated that dimensions of the stops 49 and 50, the length and weight of the rod 15, the position of the enlarged portion 43 relative to the indenting element 16, the length of the supporting cylinder 41, the gap between the lower and upper ends of the respective rods 11 and 15 as produced at the inoperative position of the apparatus, the effective length of the lever 40 and the strength of the leaf spring 44 are so selected that, upon the downward movement of the lever 13, only the lever 40 together with the cylinder 41 is at first lowered with the rod 15 maintained in the substantially same state suspended only by the leaf spring 48, and after the lever 40 has been displaced for a predetermined distance, the lower end of the rod 11 abuts the upper end of the rod 15 to press the indenting element into the specimen 32, during which, however, physical engagement between the portions 42 and 43 will never occur. When the load of the weighing mass 14 is removed by lifting the lever 13 after the indentation, the rod 15 is returned to the starting position by the force of the compression spring 48 by way of the cylinder 41, the lower end 42 of which now comes to bear against the enlarged portion 43 of the rod 15.

The hardness tester shown in FIG. 5 has advantage in addition to those of the apparatus of FIG. 2, that the inertia mass of the indenting or lever structure which may possibly contribute to the dynamical load, a source of error, can be further reduced and the hardness test can thus be carried out substantially only with the static test load applied by weighing mass or masses 14 having predetermined weights.

While salient features of this invention have been illustrated and described with reference to a particular embodiments, it should be readily apparent for those skilled in the art that modifications can be made within the spirit and scope of this invention, and it is therefore never intended to limit the invention to the exact details shown and described.

What is claimed is:

1. Apparatus for measuring hardness of a specimen by producing an indentation representative of the hardness by applying a predetermined load thereto, comprising:
   a vertically disposed weighing rod for exchangeably receiving weighing masses,
   a first horizontally disposed vertically swingable lever means for disengageably supporting said weighing rod at the lower end thereof,
   resilient means for maintaining said weighing rod in the vertical position in cooperation with said first lever means,
   a vertical load transmitting rod disposed physically separately from but in vertical alignment with said weighing rod,
   indenting means mounted on said load transmitting rod at the lower end thereof,
   a second horizontally disposed swingable lever means for holding said load transmitting rod in a vertical position,
   a counterbalancing means for urging said second lever means to a balanced position at which said load transmitting rod is out of physical contact with said weighing rod and said specimen when no load is applied to said load transmitting rod, and
   means for lowering said first lever means to thereby apply the substantially static load of said weighing masses onto said transmitting rod to press said indenting means against the surface of said specimen.

2. Apparatus for measuring hardness of a specimen as set forth in claim 1, characterized in that said second lever has long and short arms, said long arm holding said load transmitting rod, while said short arm carries said counterbalancing means.

3. Apparatus for measuring hardness of a specimen as set forth in claim 1, characterized in that the position toward which said second lever is urged by said counterbalancing means is limited by a stop means so that a small gap or space be maintained between the lower end of said weighing rod and the upper end of said load transmitting rod, when no load is applied thereto.

4. Apparatus for measuring hardness of a specimen as set forth in claim 1, characterized in that said second lever is mounted rotatably also in a horizontal plane.

5. Apparatus for measuring hardness of a specimen as set forth in claim 4, including an optical system and characterized in that a member which supports the optical system for measuring the indentation formed in the specimen is disposed rotatably in a horizontal plane in parallel to said second lever so that said optical system may be exchangeably brought to the position vertically aligned with said specimen.

6. Apparatus for measuring a hardness of a specimen as set forth in claim 5, characterized in that the radius of the horizontal rotation of said second lever is longer than that of said optical system supporting member.

7. Apparatus for measuring a hardness of a specimen as set forth in claim 1, characterized in that the fulcrum for supporting said second lever for the vertical swinging movement is disposed in substantially the same horizontal plane as said specimen.

8. Apparatus for measuring hardness of a specimen as set forth in claim 1, characterized in that said load transmitting rod is additionally supported by a cantilever-like resilient member and said second lever means consists of a vertically swingable one arm lever which is adapted to support said load transmitting rod when the apparatus is in the inoperative position and release said load transmitting rod upon initiation of the measuring operation of said apparatus so that said load transmitting rod is suspended only by said cantilever-like resilient member.

9. Apparatus for measuring hardness of a specimen as set forth in claim 8, characterized in that said load transmitting rod has an enlarged portion and is enclosed within a cylindrical body which is mounted on said one arm lever at the free end thereof and provided with an inner protrusion at the lower end thereof adapted to bear against said enlarged portion of said vertical rod in the inoperative position thereof.

10. Apparatus for measuring hardness of a specimen as set forth in claim 9, characterized in that said first lever is provided with a first abutting projection at the lower side and said second lever is provided with a second abutting projection in a position opposite to said first abutting projection, the dimensions of said first and second projections being so selected that, upon lowering of said first lever means, said one arm lever together with said cylindrical body is at first moved downwardly while said load transmitting rod remains substantially stationary as suspended by said resilient member and, upon further lowering of said first lever, said load transmitting rod is then pressed against said specimen without contacting said cylindrical body.

11. Apparatus for measuring hardness of a specimen as set forth in claim 8, characterized in that said one arm lever is vertically swingably mounted on a handle member which is rotatable around a pivot in a horizontal plane in parallel with said one arm lever, said one arm lever and said handle member being loosely connected to each other by means of a stud like means to limit the rotating movement of said one arm lever relative to said handle member.

12. Apparatus for measuring hardness of a specimen as set forth in claim 11, characterized in that said one arm lever is always urged to move upwardly by means of a compression spring disposed between said one arm lever and said handle member around said stud like means.

* * * * *